United States Patent Office

3,193,424
Patented July 6, 1965

3,193,424
PROCESS FOR ADHESIVE BONDING
John A. Scott, North Haven, Conn., assignor to Olin Mathieson Chemical Corporation, a corporation of Virginia
No Drawing. Filed Oct. 31, 1961, Ser. No. 148,829
4 Claims. (Cl. 156—73)

The present invention relates to methods of adhesive bonding. More particularly, it relates to methods of adhesive bonding of metal parts.

In recent years adhesives have become increasingly important in the joining together of elements which must withstand the application of substantial separative forces. A group of adhesives which has been found particularly useful for high-strength bonding is the group referred to generally as epoxy resins. These resins are normally applied in a liquid form after a "curing agent" has been added to initiate the resin hardening action. Among the commercially available resins of this type are the epon resins of Shell Oil Company.

One of the problems which has been encountered in joining of elements is that of properly preparing or cleaning the surface of the elements to which the adhesive is applied in joining. Where surface contaminants or surface layers of reaction products, as for example layers formed by reaction which atmospheric contaminants, are present on the surface of the element, bonding takes place between the surface layers of the elements; and the strength of the bond does not exceed the strength of the attachment of the surface layer to the element. Numerous procedures have been devised for preparing surfaces for bonding to overcome the presence of contaminant layers. Chemical etching procedures have been employed as well as abrasive blasting, solvent degreasing, and similar procedures. Individual surface preparation steps have also been used in various combinations. However, although these procedures, and combinations thereof, are effective in increasing the strength of bonds formed between elements, they add substantially to the cost of the bonding operation. Moreover, they are frequently less effective than is desired because of recontamination of the surface subsequent to the surface preparation treatment and prior to the application of adhesive.

Accordingly, one of the objects of the present invention is to provide an improved method of adhesive bonding.

Another object is to provide a method of increasing the strength of adhesive bonds formed between elements.

A further object is to reduce the cost of forming adhesive bonds of high strength.

Still another object of the invention is to provide bonded articles having novel properties.

Still another object of the present invention is to provide a method of joining elements which have heretofore been difficult or impossible to join with bonds of high strength.

Other objects and advantages of the invention will be in part obvious and in part pointed out in the description which follows.

In one of its broader aspects the object of the invention may be achieved by disposing between the confronting surfaces of elements to be joined a layer of liquid adhesive containing a finely divided solid abrasive substance, developing a relative movement of said elements to abrade the confronting surfaces thereof, and curing said adhesive to bond said surfaces together.

The manner in which the method of the present invention may be practiced in one of its broader aspects will be additionally clear from the specific illustrative examples of the practice thereof which follows. It will be understood, however, that these examples are given for illustrative purposes only, and that the scope of the invention should not be understood as being defined by or confined to these illustrations.

*Example I*

Sample specimens of aluminum metal in the form of two strips with dimensions 1 inch by 4 inches by .063 inch overlapped one half inch at the joint, were prepared for adhesive bonding and for testing of the strength of the bond formed therebetween. The bonds were tested in accordance with the Tentative Method of Test for "Strength Properties of Adhesives in Shear by Tension Loading (Metal-to-Metal)," ASTM Designation: D1002–53T.

The adhesive used in this test was Cycleweld C–14, a product of the Cycleweld Cement Products Division of Chrysler Corporation. The chemical nature of this adhesive is as follows:

A bis-phenol-A epoxy resin combined with a polysulphide. The curing agent is diethylene triamine.

In this first test the samples of aluminum were degreased by wiping with clean cheesecloth soaked in trichloroethylene. Eighty parts by weight of "Cycleweld" adhesive were combined with 20 parts by weight of aluminum oxide powder which had a mean particle size of 27 microns and which were irregularly shaped solid particles, as determined by microscopic examination. The mixture was applied to the specimens to be joined using the procedure recommended for this adhesive as follows:

The adhesive made up of 100 parts by weight of resin and 7 parts by weight of catalyst, to which the aluminum oxide powder was added, was applied to both surfaces with a glass rod to a thickness of about .005 inch. The parts were then brought together and pressed firmly to assure good contact. The adhesive was then allowed to cure at room temperature for 7 days before testing the joints. Cured film thicknesses varied from .004 to .010 inch.

The bond strength of bonded specimens were tested and the average shear stress in the adhesive joint in p.s.i. (pounds per square inch) at the failure of the joint was measured. An average shear stress of 2385 p.s.i. was found. A total of five specimens prepared in identically the same manner were tested, and the 2 sigma limits based on the five specimens tested indicated that the values of 2062–2708 p.s.i. are found. The value of sigma is the square root of the summation of the squared difference between the mean and the individual values divided by the number of samples. As a first approximation on the basis of statistical analysis, it may be said that there is a 95 percent confidence level that if these tests were repeated under identical conditions, the values would fall within these limits.

*Example II*

The procedure of Example I was repeated except that in this case the surfaces of the elements were rubbed together using hand pressure after a layer of abrasive containing adhesive had been disposed therebetween.

No appreciable changes of shear stress or of the confidence limits thereof were found from tests of the five samples.

*Example III*

The joining procedure of Example I was repeated except that in this case a vibratory motion was established between the two elements after a layer of the abrasive containing adhesive was disposed therebetween. The vibration had an amplitude of $\frac{1}{16}$ of an inch and a frequency of 120 cycles per second and was generated by a Burgess "Vibro-Graver" made by Burgess Vibrocrafters, Inc.

The value of average shear stress in the joint at failure was 2153 p.s.i. and the 2 sigma limits obtained were 1551–2755 p.s.i.

From the foregoing three examples it is evident that there is essentially no improvement in the bond strength produced in an adhesively bonded joint as a result of the use of the abrasive containing adhesive in combination with aluminum metal test specimens prepared by degreasing.

*Example IV*

Specimens of aluminum were prepared for testing as described in Example I except that in this case the surfaces of the specimens which were to receive the abrasive-adhesive mixture were first etched with a sulfuric acid–sodium dichromate solution. The particular solution used for this etching was as follows:

66 parts by weight sodium dichromate (analytical grade)
660 parts by weight sulphuric acid (S.G. 1.84)
100 parts by weight water.

The solution was heated to 160° F. and the specimens immersed for 10 minutes.

Following the etching, the metal surfaces were rinsed and dried and a layer of the adhesive containing 18 parts by weight of aluminum oxide per 100 parts of adhesive was disposed between the surface to be joined. No relative motion of any type was imparted to the parts after joining and prior to the setting of the adhesive. Testing of the bond strength was carried out as described in Example I, and values of 2220 p.s.i. for the average shear stress and 1752–2688 for the 2 sigma limits were found.

*Example V*

Test specimens were prepared and bonded as described in Example IV except that in this case a rubbing motion was added to the bonding procedure to abrade the surfaces of the metal coated by the abrasive-adhesive mixture prior to the setting of the adhesive. This rubbing motion involved placing the surfaces to be bonded in juxtaposition and while holding them firmly together moving one surface relative to the other for a minimum time of 30 seconds at a rate of about 120 to 130 strokes per minute with a displacement of approximately $3/16$ of an inch.

The values of the average shear stress and 2 sigma limits found were 2973 p.s.i. and 2521–3425 p.s.i., respectively.

*Example VI*

Specimens of aluminum metal were prepared for testing as described in Example V except that in this case a vibratory motion was substituted for the rubbing motion described in that example.

The values of shear stress and 2 sigma limits found were 3037 p.s.i. and 2695–3379 p.s.i., respectively.

*Example VII*

Sample specimens of aluminum were prepared for testing as described in Example I. The specimens were degreased and then abrasive blasted. The abrasive blasting procedure used was to traverse the area to be bonded using a side-to-side motion at a rate of about 60 inches per minute with an S. S. White Industrial Abrasive Unit, Model "C" made by The S. S. White Dental Manufacturing Co. fitted with a 351–420X nozzle tip.

The abrasive material was S. S. White Abrasive Powder No. 1, which is essentially an aluminum oxide.

After abrasive blasting an abrasive-adhesive mixture was applied as described in Example I. No relative motion of the element surfaces to be bonded was developed between the time the abrasive-adhesive mixture was applied and the time it set. The average shear stress and 2 sigma limits found after bonding was completed were 3045 p.s.i. and 2849–3249 p.s.i., respectively.

*Example VIII*

Specimen samples of aluminum were prepared for bonding as described in Example IV. In this case the abrasive blast procedure described in Example VII was used following the etching procedure described in Example IV. The abrasive adhesive mixture was applied as in Example IV, but no relative motion of the parts was developed between the time of application of the abrasive-adhesive mixture and the time it set.

An average shear stress of 2910 p.s.i. and confidence limits of 2516–3304 p.s.i. were found.

When the results obtained in Examples V and VI are compared to those found in Example IV, it is evident that the average values of joint strengths are increased about 35% for etched specimens after the joint has been rubbed or vibrated.

It is also evident that this rubbing or vibrating when carried out as an integral part of bond formation procedure is equivalent in its effect to abrasive blasting of the specimens as described in Examples VII and VIII prior to their assembly and bonding.

Increased strengths may also be obtained on specimens which have been degreased only as described in Examples II and III by changes of the factors essential to improvement of bond strength in accordance with this invention, namely, the abrasive concentration, the particle size of the abrasive used, the particle shape of the abrasive, and the relative energy employed in abrading the surfaces coated with the adhesive-abrasive mixture.

A number of advantages are apparent from the above teaching and from the use which has been made of the present invention. Among the principal advantages are the attainment of increased bond strength for metal to metal joint using a given adhesive and the increased simplicity and reduced cost of obtaining joints of the required strengths.

Any other abrasive capable of abrading the metal surface to increase the rugosity of the material appreciably and to expose fresh metal is useful. Abrasive materials such as burstone, corundum, emery, garnet, infusorial earth, pumice, silicon carbide, silicon dioxide, and similar abrasives may accordingly be used.

Regarding the nature of the materials which can be joined, any solid materials for which there is a difficulty in forming the bond may be bonded with greater bond strength through use of this method. Plastics, metals, ceramics, and similar solid materials as employed in their usual applications may be assembled and bonded to achieve superior bonds through use of this invention.

Adhesive materials which may be employed in practicing the invention may be any of a large number of conventional adhesives which can be used between the fayed surfaces in a fluid state. The stronger bonding materials preferred for use in this method are epoxy base materials and phenolic base materials. Various additives are included in such adhesive materials to give desired mechanical and physical properties. For example, elastomers, plasticizers, catalysts, and inert fillers are included.

Surface contaminants and similar bond inhibiting surface deposits are preferably removed by conventional methods such as etching, degreasing, wire brushing, or the like before practicing the method of the invention.

One of the unique features of the method is that it permits oxide surface coatings, formed as reaction products of atmospheric reaction with the metal surface, to be penetrated to expose fresh metal and permits the direct bonding of this exposed metal with the co-present adhesive. Loosely adherent oxide surface coatings are also broken up and dispersed in the abrasive adhesive mixture so that bonding occurs directly with the metal surface rather than with the loosely adherent coating. Bonds formed with such loosely adherent coatings are otherwise limited in bond strength by the strength of the bond between the base metal and the oxide coating.

Regarding the type of motion which can be employed to produce improved bonding, essentially any type of movement of one fayed surface relative to the other which effects an appreciable increase of the rugosity of the confronted surfaces can be employed. Known techniques, such as microscopical examination of a surface before and after abrading treatment, are used in establishing the degree of change of rugosity necessary for an appreciable increase in bond properties. Ultrasonically induced motion as obtained with an ultrasonic welding head, hand imparted motion, or other machine imparted motions have been found suitable where an appreciable increase in rugosity is produced from use of the motion in connection with an adhesive-abrasive mixture.

Filler materials conventionally added to bonding agents must be omitted where they interfere with the abrasive action of the contained abrasive. The abrasive itself actually serves the purpose of some fillers in increasing the strength of the cured adhesive. However, in this case the abrasive serves the combined function of strengthening the bond through abrasive action as well as by serving as a filler. Moreover, abraded material from the surfaces similarly serve a filler and strengthener function.

Since many examples of the foregoing procedures and apparatus may be carried out and made and since many modifications can be made therein without departing from the scope of the subject invention, the foregoing is to be interpreted as illustrative only and not as defining or limiting the scope of the inventions.

What is claimed is the following:

1. The method of forming an adhesive bond between two substantially plane aluminum surfaces which comprises: providing a liquid adhesive containing a finely divided solid abrasive substance; placing said substantially plane aluminum surfaces in confronting relationship with a layer of said liquid adhesive containing said abrasive disposed therebetween; developing a relative movement between the faying surfaces to impart a movement to said particles relative to said surfaces and to abrade said surfaces; and hardening said adhesive to bond said confronting surfaces together.

2. A process according to claim 1 wherein said abrasive substance is finely divided aluminum oxide.

3. A method according to claim 1 wherein the movement of faying surfaces is a vibratory movement.

4. The method of forming an adhesive bond between two substantially plane aluminum surfaces which comprises: substantially removing the contaminated oxide layer from the aluminum surfaces to be bonded; providing a liquid adhesive containing a finely divided solid abrasive substance; placing said substantially plane, substantially oxide free aluminum surfaces in confronting relationship with a layer of said adhesive containing said abrasive disposed therebetween; developing a relative movement between the faying surfaces to impart a movement to said particles relative to said surfaces and to abrade said surfaces; and hardening said adhesive to bond said confronting surfaces together.

References Cited by the Examiner

UNITED STATES PATENTS

| 2,536,183 | 1/51 | Jamieson | 161—258 |
| 2,876,154 | 3/59 | Usab | 156—153 |
| 3,059,697 | 10/62 | Pitts | 156—158 |

FOREIGN PATENTS 579,355  7/46  Great Britain.

OTHER REFERENCES

Adhesive Bonding of Metals, by G. Epstein, published by Reinhold Publishing Corp., copyrighted 1954; p. 170 relied upon.

EARL M. BERGERT, *Primary Examiner.*